United States Patent
Boot et al.

(10) Patent No.: US 6,179,167 B1
(45) Date of Patent: *Jan. 30, 2001

(54) DISPENSING DEVICE

(75) Inventors: Ricardo Leon Boot; Gerrit Klaas Bunschoten; Rudolf Cornelis Verheul, all of Maarssen (NL)

(73) Assignee: Diversey Lever, Inc., Plymouth, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/255,942

(22) Filed: Feb. 23, 1999

(30) Foreign Application Priority Data

Feb. 25, 1998 (NL) .................................................. 98200592

(51) Int. Cl.⁷ ....................................................... B65B 1/04
(52) U.S. Cl. ........................ 222/181.3; 222/548; 141/346
(58) Field of Search ..................................... 222/631, 226, 222/239, 505, 513, 548, 565, 181.3; 141/346, 351, 352

(56) References Cited

U.S. PATENT DOCUMENTS

| D. 340,823 | 11/1993 | Bunschoten et al. . |
| D. 393,975 | 5/1998 | Bunschoten et al. . |
| 1,612,719 | 12/1927 | Haddad . |
| 2,092,137 | 7/1937 | Punte . |
| 3,125,260 | * 3/1964 | Dreps . |
| 4,141,461 | * 2/1979 | LaChance ............................. 222/513 |
| 4,560,092 | 12/1985 | Souza . |
| 5,417,939 | 5/1995 | Bunschoten et al. . |
| 5,934,516 | * 8/1999 | Strycharske et al. ................. 222/158 |

FOREIGN PATENT DOCUMENTS

| 861 666 | 1/1953 | (DE) . |
| 2 024 598 | 12/1971 | (DE) . |
| 295 02 494 | 5/1995 | (DE) . |
| 856475 | 5/1998 | (EP) . |
| 1 016 494 | 11/1952 | (FR) . |
| 1 239 528 | 7/1960 | (FR) . |
| 9407752 | 4/1994 | (WO) . |

* cited by examiner

Primary Examiner—Steven O. Douglas

(57) ABSTRACT

The disclosure relates to a device for dispensing material such as detergent powder or the like from a material container (2), the device comprising a dispensing chamber (16) arrangeable on the material container, the dispensing chamber comprising:

Figure 1:
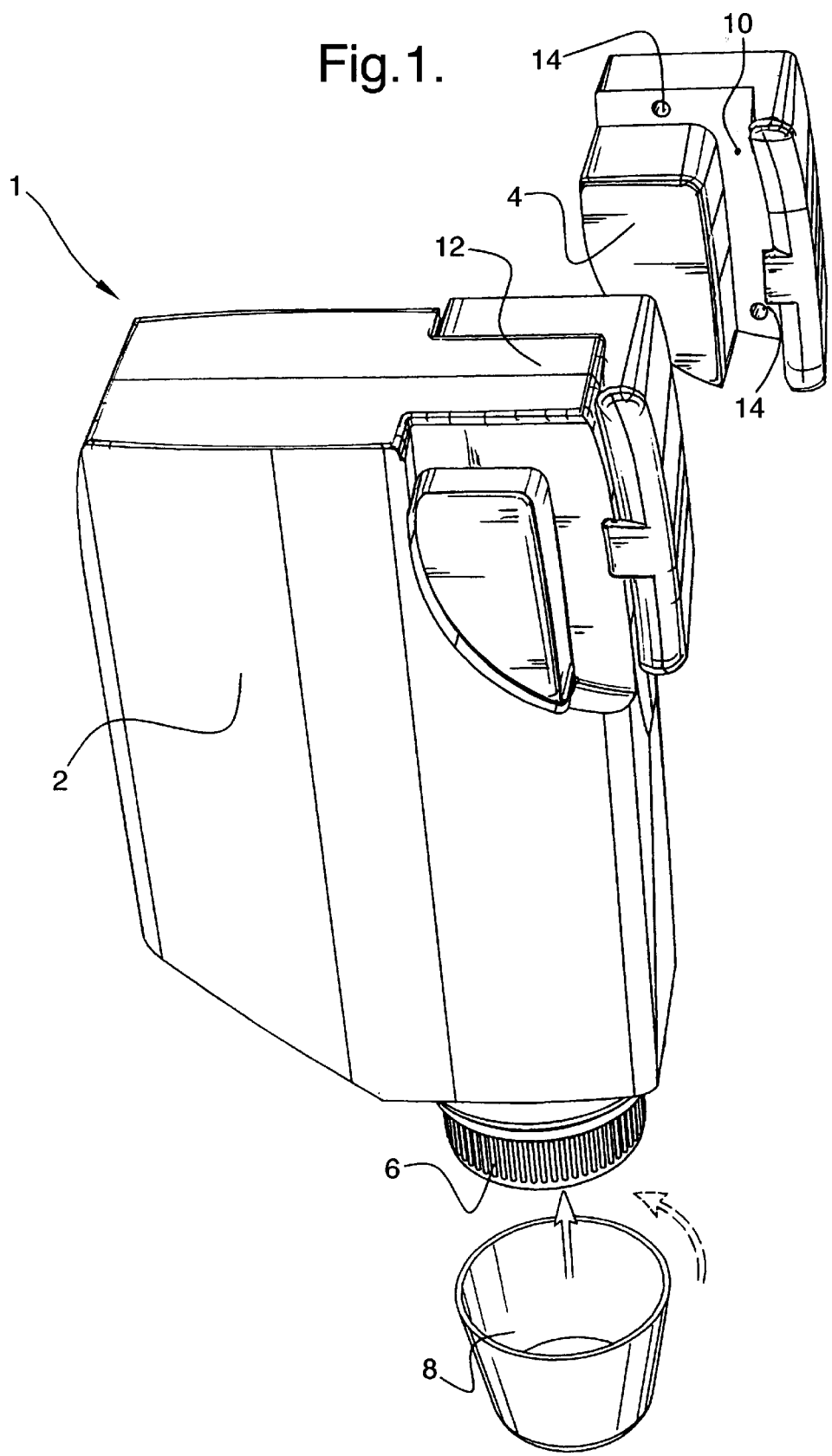

an open distal end (20) wherethrough powder is introducible into the device from the material container, a proximal end (22) provided with one or more material release openings (42), wherethrough material is dispensable from the device, a cover (18) mounted over the proximal end of the dispensing chamber, said cover provided with one or more material release openings (54), and displaceable securing means (74;55) for displaceably securing the cover to the dosing chamber in such a way that the cover and chamber are mutually displaceable between a dispensing arrangement, wherein the dispensing chamber openings (42) are alignable with the cover openings (54), and a non-dispensing arrangement, wherein the dispensing arranging openings are non-alignable with the cover openings.

16 Claims, 5 Drawing Sheets

DISPENSING DEVICE

FIELD OF THE INVENTION

The present invention relates to a dispensing device for dispensing material, such as detergent powder or the like from a container, to an assembly comprising such a device and to a method for dispensing material such as powder detergent.

BACKGROUND OF THE INVENTION

A variable quantity dispensing device for granular material is known for example from the U.S. Pat. No. 4,560,092. An object of the present invention is to provide an alternative dispensing device, in particular for dispensing powder detergent from a container.

DEFINITION OF THE INVENTION

According to a first aspect of the present invention there is provided a device for dispensing material such as detergent powder or the like from a material container, said device comprising a dispensing chamber arrangeable on the material container, said dispensing chamber comprising:
- an open distal end wherethrough powder is introducible into the device from the material container,
- a proximal end provided with one or more material release openings, wherethrough powder is dispensable from the device,
- a cover mounted over the proximal end of the dispensing chamber, said cover provided with one or more material release openings, and
- displaceable securing means for displaceably securing the cover to the dosing chamber in such a way that the cover and chamber are mutually displaceable between a dispensing arrangement, wherein the dispensing chamber openings are alignable with the cover openings, and a non-dispensing arrangement, wherein the dispensing arranging openings are non-alignable with the cover openings.

According to a further aspect of the present invention there is provided an assembly comprising this dispensing device and a material receptacle, for powder detergent or the like, said receptacle being couplable with the cover for receiving dispensed material.

Preferably, the assembly of the present invention further comprises a material container to which the dispensing device is releasably attachable.

According to yet another aspect of the present invention, there is provided a method for dispensing material, such as powder detergent or the like, using an assembly or device according to the invention, said method comprising the steps of manually, rotatably displacing the cover around the dispensing chamber in order to align the cover and dispensing chamber openings wherethrough material is dispensed into the receptacle, until the material reaches a predetermined level in the receptacle, at which level further dispensing of material from the device is prevented.

DETAILED DESCRIPTION OF THE INVENTION

Desirably the device according to the present invention comprises displacement limiting means for limiting the mutual displacement of the cover and the chamber from the non-dispensing arrangement to the dispensing arrangement. These displacement limiting means effectively comprise one or more baffle-like elements arranged on the inside wall of the cover and one or more corresponding baffle-like elements arranged on the outer wall of the dispensing chamber.

Furthermore, the device of the invention preferably comprises automatic re-positioning means for automatically repositioning the cover and chamber in the non-dispensing arrangement from the dispensing arrangement. These re-positioning means effectively comprise a spring arrangeable between a rest state, wherein the device occupies its non-dispensing arrangement, and a tensioned state, wherein the device occupies its dispensing arrangement. The spring is preferably mounted on the dispensing chamber.

The device of the invention preferably further comprises fixed position spring locking means for fixably locking a first spring end to the device and displaceable spring locking means for displaceably locking a second end of the spring to the device. Effectively, the first spring end is locked to the dispensing chamber, whereas the second spring end is desirably locked to the cover.

The tip of the proximal end of the cover effectively comprises a locking opening, which is preferably in the form of a slot, wherein the displaceable securing means are preferably fixably locked. These displaceable securing means desirably rotatably extend through a circular locking opening in a tip of a proximal end of the dispensing chamber.

Good results were obtained when the displaceable securing means comprise a post-like member comprising a proximal securing part, extending through the circular locking opening of the chamber to fixably lock in the cover slot and a distal member having a length substantially equal to or greater than the height of the dispensing chamber. In order to secure a good flow of material through the dispensing chamber, the securing post-like member effectively comprises one or more stirring elements arranged thereon for stirring the material when this flows into the device from the material container.

Figure 2:
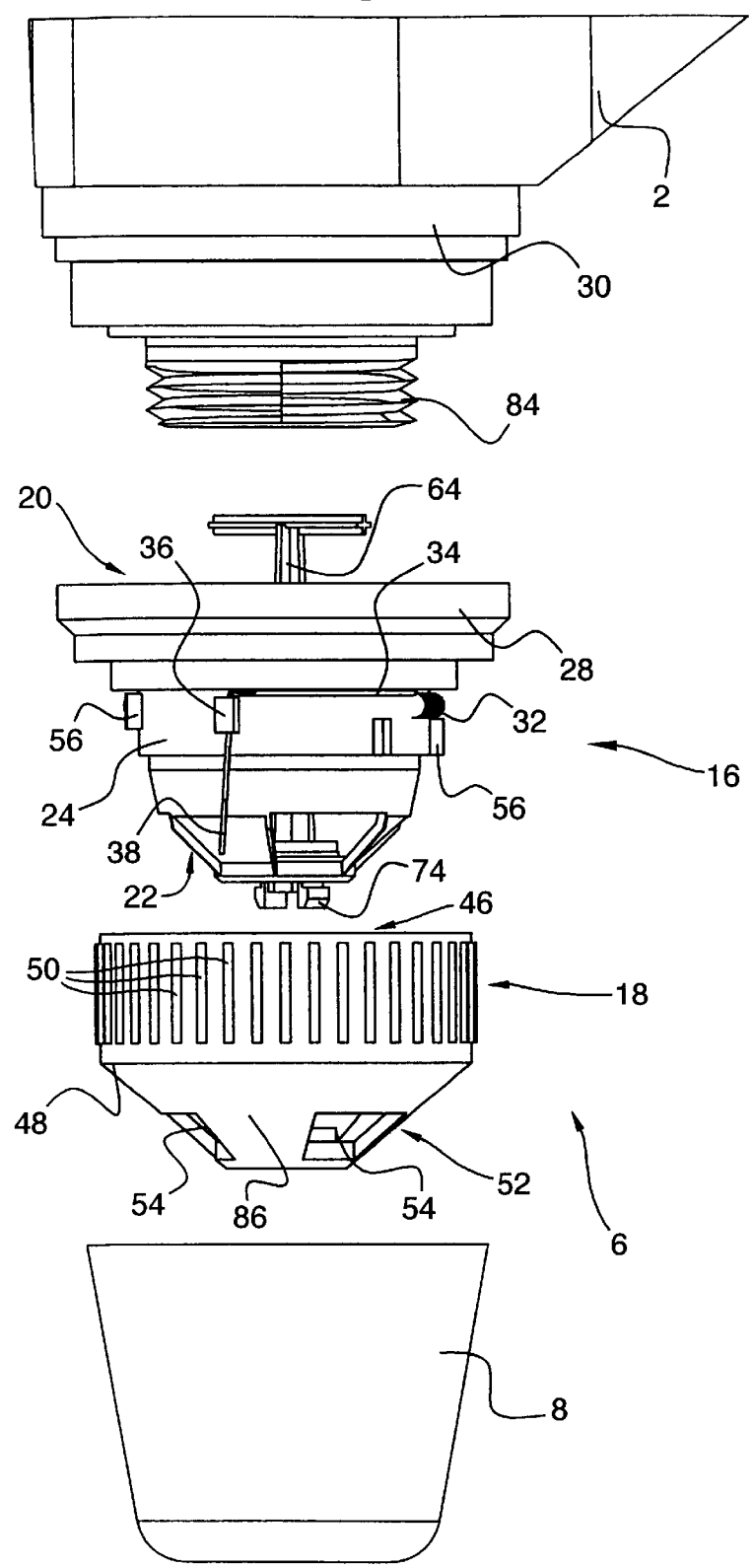
Figure 3:
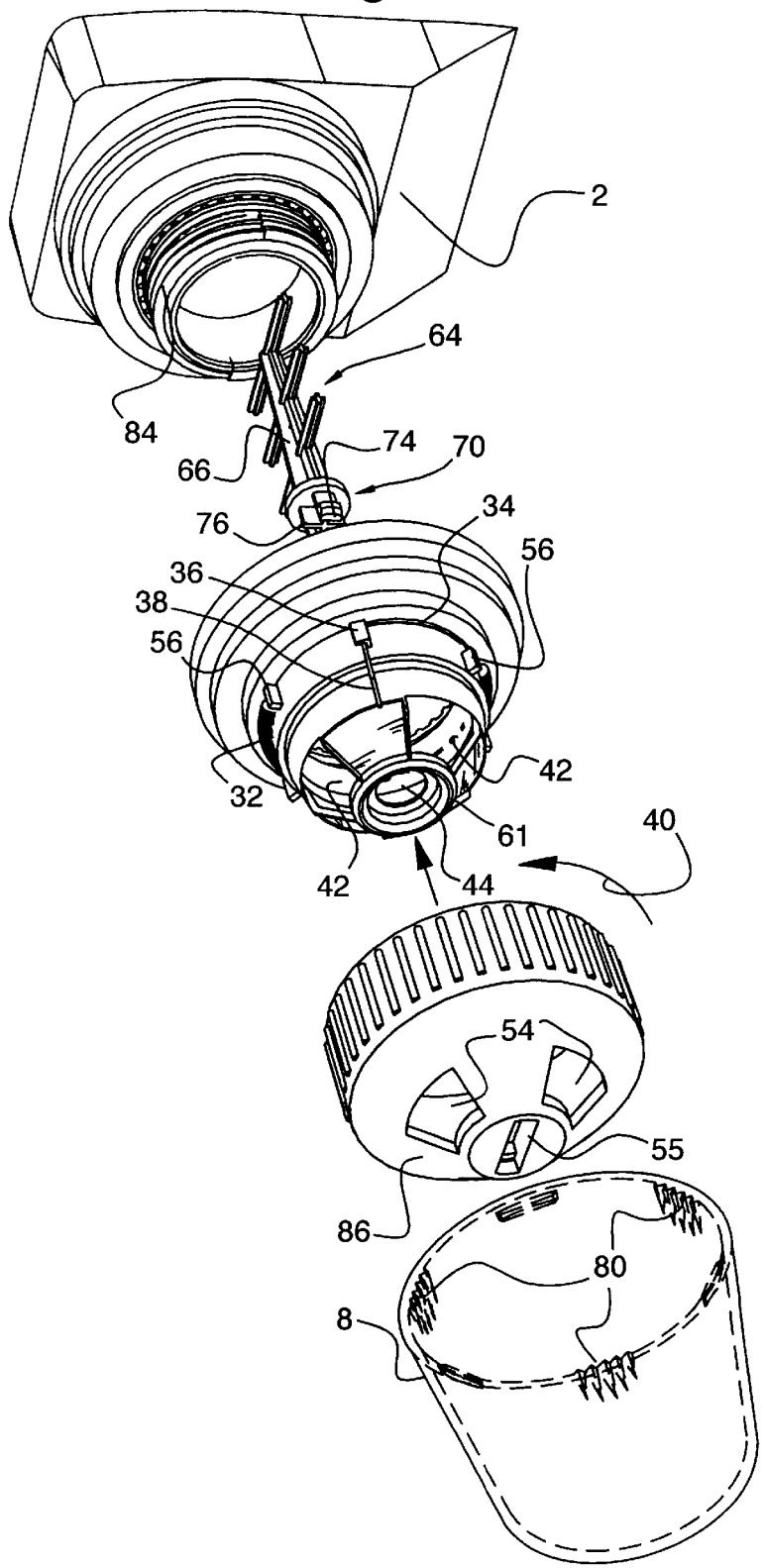
Figure 4:
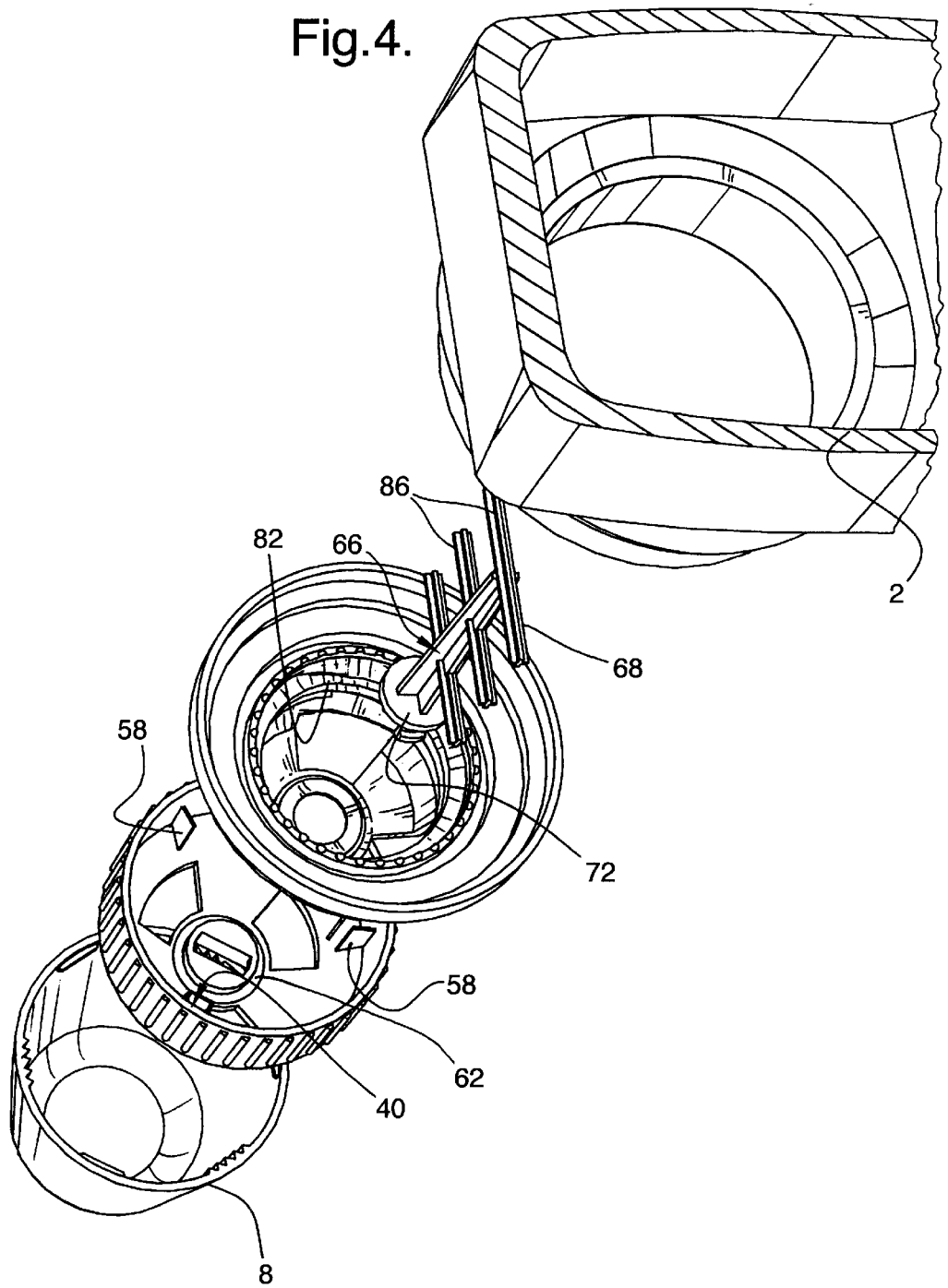
Figure 5:
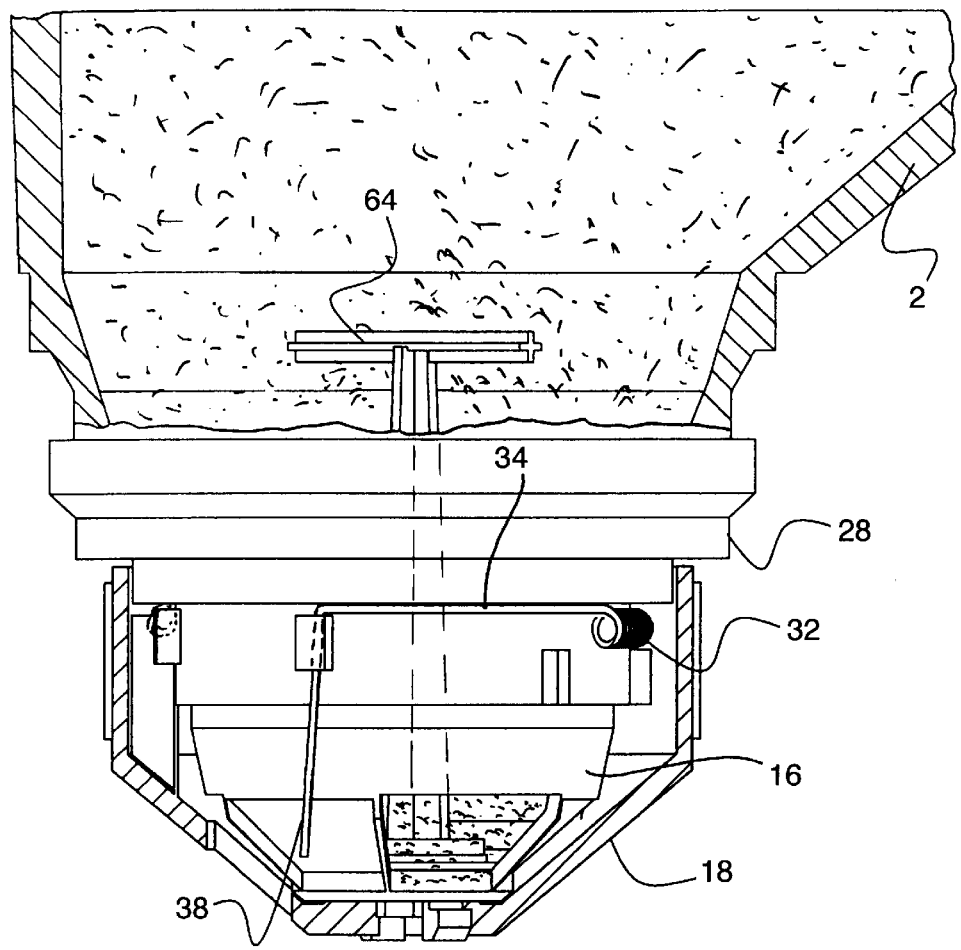
Figure 5:
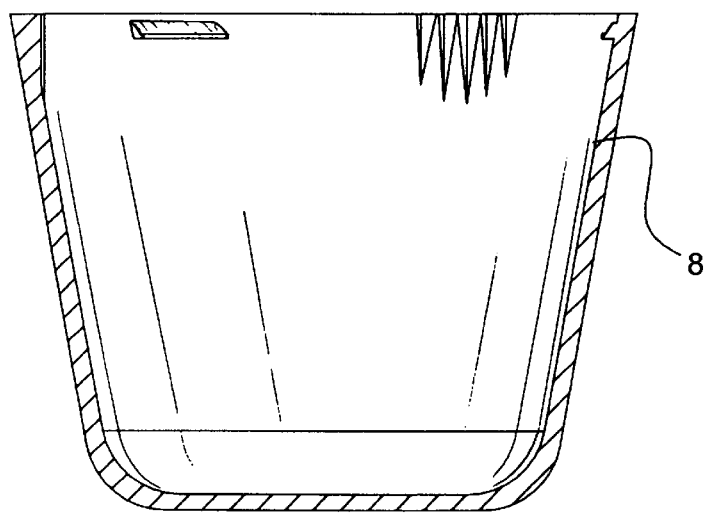

The invention will now be described in detail with reference to the following description and figures, wherein:

FIG. 1 shows a perspective, exploded view of a preferred embodiment of the assembly according to the present invention, FIG. 2 shows an exploded side view of the assembly from FIG. 1, FIG. 3 shows an exploded, perspective bottom view of a preferred embodiment of the device according to the present invention, FIG. 4 shows an exploded perspective top view of the device from FIG. 3, and FIG. 5 shows a partially cut away side view of the assembly according to the present invention.

An assembly 1 (FIG. 1) comprises a powder detergent container 2, a container hanger 4, a dispensing device 6 attached to a neck of the container 2 and a powder detergent dispensing cup receptacle 8.

The container hanger 4 is provided with an upturned L-shaped channel 10, wherein a container handle 12 is interlockable. The container hanger 4 can be affixed at an easy to reach height to a wall near a domestic washing machine for example, by means of screws passing through screw holes 14.

The dispensing device 6 consists of a conical dosing chamber 16 and a cover 18 therefor (FIGS. 2–5). The dosing chamber 16 comprises an open distal end 20, a proximal end 22 and a middle section 24. The open distal end 20 comprises an upstanding circular lip section 28, cooperable with a neck 30 of the container 2. The distal end 20 narrows successively through the cylinder-like middle part 24 to the truncated nose-like form of the proximal end 22.

A spring 32 is mounted externally on this middle part 24. A first end of the spring, not shown, is secured to the interior of the chamber 16. A wire-like section 34 of the spring 32 extends from the spring 32 around the middle part 24 and is curved downwardly around a rigid flap 36 to terminate in a downwardly extending second end 38 (FIGS. 2, 3 and 5).

This second end 38 of the spring extends into a securing channel 40 arranged on an inner wall of the cover 18 (FIG. 4).

Three equally spaced apart sloping openings 42 are arranged in the nose of the proximal end 22 of the dispensing chamber 16. A circular opening 44 is arranged in a flat tip of the nose end 22 (FIGS. 3 and 4).

The cover 18 comprises an open distal end 46 continuous with an upstanding circular wall 48, equipped on the exterior thereof with a number of rib sections 50. A truncated nose section 52 of the cover 18 is provided with three equally spaced apart, sloping material release openings 54 and a tip opening 55 having the form of a slot.

Five baffles 56 are arranged on the middle part 24 of the chamber 16 (FIGS. 2, 3 and 5). Two cooperating baffles 58 are arranged on the interior of the cover wall 48 (FIG. 4).

The conical nose end 22 of the dispensing chamber 16 terminates in a downwardly protruding circular profile 61, extending around the circular opening 44, which couples around an upstanding internal circular ring 62 of the cover 18 (FIGS. 3 and 4).

A locking post 64, preferably extruded from plastic, comprises a stem 66, whereon a number of stirring branches 68 extend laterally therefrom. In a non shown embodiment, the stirring branches can be arranged on the stem to extend therefrom at angles of roughly 120° to each other, in order to ensure a good flow through the chamber and cover openings. A proximal end 70 of the post 64 is provided with a circular washer-like element 72, whereunder two securing hooks 74 depend, which hooks 74 are separated by a plate member 76, which cooperates with a cut away section of the ring 62 (not shown). The stirrers of the securing post, enable bridging, i.e. clumping of the powder, in the neck of the container to be prevented, since this stirs up the powder on its flow from the container to the dispensing device.

A cup 8 releasably clicks over the cover 18 by means of a number of reciprocating rib sections 80 (FIG. 3), which interlock with the ribs 50 of the cover 18.

The cover 18 is rotateably fixed to the chamber 16 by means of the post 64. The hooks 74 of the post 64 pass through the circular nose opening 44 of the dosing chamber 16 so that the washer 72 of the post 64 rests against an internal circular rim of the circular chamber opening 44 (FIGS. 4, 5). The hooks 74 lock over the edges of the cover slot 55 to rotateably affix the cover 18 to the chamber 16 (FIG. 5).

The middle part 24 of the dispensing chamber 16 is provided internally with a screw thread 82 which cooperates with a screw thread 84 of the neck 30 of the container 2 to secure the device to said container. When the spring 32 occupies its resting state, as shown in the FIGS. 2–5, the cover openings 54 and the dispensing chamber openings 42 are not aligned, so that any powder in the dispensing chamber is kept therein, by means of closed sections 86 of the truncated nose 52 of the cover 18, covering the dispensing chamber openings 42.

In use the user merely grips the cup 8 and twists. On doing so the cover 18 and post 64 rotate until the cover openings 54 are aligned with the chamber openings 42. The dispensing chamber is fixed in position on the container neck.

The cover 18 is prevented from further rotation by means of the chamber baffles 56 abutting the cover baffles 58. In this position the spring 32 is fully expanded, the second end 38 thereof also being displaced along with the cover 18 since this end 38 is held in the cover channel 40.

In this position the dispensing chamber openings and the cover openings are aligned whereby powder flows from the container, bridging being prevented by the stirring branches extending into the neck of the container, into the dispensing device and through the openings thereof and the openings of the cover into the cup.

Once the powder has reached the level of the upper wall of the cover openings, the flow of powder into the cup is cut off due to the powder already present in the cup.

At this point the user simply releases the cover, whereby this is displaced back into the non-dispensing position, by the spring, reassuming its resting state. In this position, the cover and dispensing chamber openings are non-aligned. The precisely measured contents of the cup can then be added into a washing machine.

It will be noted that the device according to the present invention makes repeated dispensing of an accurate, predetermined amount of washing powder very simple and easy, i.e. giving the required amount of powder at each dispensation. The required amount of powder is determined by the volume of the cup, which can vary according to the user's wishes.

Furthermore, the device according to the present invention ensures substantially against spillage and overdosing which in turn leads to a cost effective, and efficient washing. Furthermore, due to the container hanger, the assembly can be fixed to a wall near a household washing machine for example, whereby the powder detergent is always within easy reach, at a specific location. If the assembly is positioned close to the washing machine, kneeling, bending or lifting can be avoided whereby dosing can be carried out at head height, for example, instead of being carried out as is usually the case on the ground, whereby spillage and overdosing are substantially prevented.

Once the container is empty, this can be, after removal of the dispenser, replaced by a similar filled container or simply refilled with powder detergent, the dispensing device screwed back onto the neck thereof whereafter the assembly is again ready for use.

The invention is not limited to the above description, the requested rights are rather determined by the following claims.

What is claimed is:

1. Device for dispensing material such as detergent powder from a material container (2), said device comprising a dispensing chamber (16) arrangeable on the material container (2), said dispensing chamber comprising:

an open distal end (20) wherethrough powder is introducible into the device from the material container, a proximal end (22) provided with one or more material release openings (42), wherethrough material is dispensable from the device, a cover (18) mounted over the proximal end of the dispensing chamber, said cover provided with one or more material release openings (54), and displaceable securing means (74;55) for displaceably securing the cover to the dosing chamber in such a way that the cover and chamber are mutually displaceable between a dispensing arrangement, wherein the dispensing chamber openings (42) are alignable with the cover openings (54), and a non-dispensing arrangement, wherein the dispensing arranging openings are non-alignable with the cover openings.

2. Device according to claim 1, further comprising displacement limiting means (56;58) for limiting the mutual displacement of the cover and the chamber from the non-dispensing arrangement to the dispensing arrangement.

3. Device according to claim 2, wherein the displacement limiting means comprise one or more baffle-like elements (58) arranged on an inside wall of the cover and one or more corresponding baffle like elements (56) arranged on an outer wall of the dispensing chamber.

4. Device according to claim 1, further comprising automatic re-positioning means (32) for automatically re-positioning the cover and chamber in the non-dispensing arrangement from the dispensing arrangement.

5. Device according to claim 4 wherein the re-positioning means comprise a spring (32) arrangeable between a rest state, wherein the device occupies its non-dispensing arrangement, and a tensioned state, wherein the device occupies its dispensing arrangement.

6. Device according to claim 5, wherein the spring is mounted on the dispensing chamber (16).

7. Device according to claim 1, further comprising fixed position spring locking means for fixably locking a first spring end to the device and displaceable spring locking means for displaceably locking a second end of the spring to the device.

8. Device according to claim 7, wherein the first spring end is locked to the dispensing chamber (16) and wherein the second spring end (38) is locked to the cover (18).

9. Device according to claim 1, wherein a tip of the proximal end (22) of the dispensing chamber is provided with a circular locking opening (44), wherethrough the displaceable securing means rotatably extend.

10. Device according to claim 1, wherein a tip of a proximal end of the cover (18) comprises a locking opening (55), preferably having the form of a slot, wherein the displaceable securing means are fixably locked.

11. Device according to claim 10, wherein the displaceable securing means comprise a post-like member (64) comprising a proximal securing part (70), extending through the circular locking opening of the chamber (16) to fixably lock in the cover slot and a distal part (66) having a length substantially equal to or greater than the height of the dispensing chamber.

12. Device according to claim 11, wherein the securing post (64) comprises one or more stirring elements (68) arranged thereon for stirring the material when this flows into the device from the material container.

13. Assembly comprising a device according to claim 1 and a material receptacle (8), couplable with the cover (18) for receiving dispensed material.

14. Assembly according to claim 13, further comprising a material container (2) to which the device is releasably attachable.

15. Method for dispensing material, such as detergent powder using an assembly of claim 13 or a device of claim 1, comprising the steps of manually rotatably displacing the cover (18) around the dispensing chamber (16) in order to align the cover and dispensing chamber openings wherethrough material is dispensed into the receptacle (8), until the material reaches a predetermined level in the receptacle, at which level further material dispensation from the device is prevented.

16. The device according to claim 1 wherein said device is fixable to a wall.

* * * * *